United States Patent
Qurashi et al.

(10) Patent No.: US 9,432,666 B2
(45) Date of Patent: Aug. 30, 2016

(54) CAVLC DECODER WITH MULTI-SYMBOL RUN BEFORE PARALLEL DECODE

(71) Applicant: Intel Corporation, Santa Clara, CA (US)

(72) Inventors: Mohmad I. Qurashi, Orangevale, CA (US); Samuel Wong, Santa Clara, CA (US); Hiu-Fai R. Chan, Rancho Cordova, CA (US); Scott W. Cheng, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 739 days.

(21) Appl. No.: 13/719,679

(22) Filed: Dec. 19, 2012

(65) Prior Publication Data

US 2013/0259135 A1   Oct. 3, 2013

Related U.S. Application Data

(60) Provisional application No. 61/617,318, filed on Mar. 29, 2012.

(51) Int. Cl.
| | | |
|---|---|---|
| *H04N 19/00* | (2014.01) | |
| *H04N 7/26* | (2006.01) | |
| *H04N 19/91* | (2014.01) | |
| *H04N 19/44* | (2014.01) | |
| *H03M 7/40* | (2006.01) | |

(52) U.S. Cl.
CPC ........ *H04N 19/00951* (2013.01); *H04N 19/44* (2014.11); *H04N 19/91* (2014.11)

(58) Field of Classification Search
CPC .............. H04N 7/50; H04N 7/26106; H04N 7/26244; H04N 7/26313; H04N 7/30; H03M 7/30; H03M 7/3088; H03M 7/3086; H03M 7/3084; G06T 9/005
See application file for complete search history.

(56) References Cited

U.S. PATENT DOCUMENTS

| | | | | |
|---|---|---|---|---|
| 5,903,311 A | * | 5/1999 | Ozcelik ................... | H03M 7/40 375/240.2 |
| 6,694,512 B1 | * | 2/2004 | Fujinami ................. | G06F 8/443 713/500 |
| 6,876,317 B2 | * | 4/2005 | Sankaran ............ | H03M 7/4006 341/107 |
| 7,236,526 B1 | * | 6/2007 | Kitamura ................. | 375/240.16 |
| 7,262,722 B1 | * | 8/2007 | Jahanghir et al. ............ | 341/107 |
| 7,339,507 B1 | * | 3/2008 | Guo ........................ | H04N 19/13 341/107 |
| 7,602,850 B2 | * | 10/2009 | Reese ..................... | H03M 7/42 375/240.23 |
| 7,773,004 B2 | * | 8/2010 | Xiao ..................... | H03M 7/425 341/50 |
| 7,804,903 B2 | * | 9/2010 | Haque et al. ............ | 375/240.25 |

(Continued)

FOREIGN PATENT DOCUMENTS

WO    2007062428    5/2007

OTHER PUBLICATIONS

PCT International Search Report and Written Opinion issued in corresponding PCT/US2013/033949 dated Aug. 27, 2013, (12 pages).

(Continued)

*Primary Examiner* — Sath V Perungavoor
*Assistant Examiner* — Howard D Brown, Jr.
(74) *Attorney, Agent, or Firm* — Trop Pruner & Hu, P.C.

(57) ABSTRACT

Context-adaptive variable length bitstream decoding performance may be improved and power consumption reduced by pushing the variable length decoding beyond one syntax element per clock pulse.

20 Claims, 5 Drawing Sheets

(56) References Cited

U.S. PATENT DOCUMENTS

| | | | | |
|---|---|---|---|---|
| 7,809,203 | B2* | 10/2010 | Lee | H04N 19/00 375/245 |
| 7,965,767 | B2* | 6/2011 | Jahanghir et al. | 375/240.01 |
| 2003/0147463 | A1* | 8/2003 | Sato et al. | 375/240.05 |
| 2005/0069039 | A1* | 3/2005 | Crinon | H04N 19/159 375/240.26 |
| 2005/0083218 | A1* | 4/2005 | Regunathan | H04N 19/52 341/65 |
| 2005/0152457 | A1* | 7/2005 | Regunathan | H04N 19/159 375/240.25 |
| 2005/0259742 | A1* | 11/2005 | Hellman | H04N 19/44 375/240.23 |
| 2008/0246637 | A1* | 10/2008 | Chen | H03M 7/4006 341/51 |
| 2009/0034611 | A1* | 2/2009 | James | H04N 19/70 375/240.03 |
| 2009/0273706 | A1* | 11/2009 | Tu et al. | 348/420.1 |
| 2013/0050254 | A1* | 2/2013 | Tran | G06F 3/14 345/629 |

OTHER PUBLICATIONS

Chen, T., et al., "Architecture Design of H.264/AVC Decoder with Hybrid Task Pipelining for High Definition Videos," Circuits and Systems, 2005, IEEE International Symposium on May 23-26, 2005, (4 pages).

George, T., et al., "The Architecture of Fast H.264 CAVLC Decoder and its FPGA Implementation," Intelligent Information Hiding and Multimedia Signal Processing, 2007, IIHMSP, Third International Conference on Nov. 26-28, 2007 (4 pages).

Guanghua, C., et al., "VLSI Implementation of CAVLD Decoder with Power Optimized for H.264/AVC Video Decoding", Signal Processing, 2008. ICSP 2008, 9th International Conference on Oct. 26-29, 2008 (4 pages).

* cited by examiner

CAVLC DECODER WITH MULTI-SYMBOL RUN BEFORE PARALLEL DECODE

CROSS REFERENCE TO RELATED APPLICATIONS

This application is a non-provisional application claiming priority to provisional application Ser. No. 61/617,318, filed on Mar. 29, 2012, hereby expressly incorporated by reference herein.

BACKGROUND

This relates to the field of compression and decompression; more particularly, it relates to video content adaptive variable length coding (CAVLC).

Video coding is used in a wide range of multimedia applications including digital television, video conferencing, mobile video and video streaming. Video coding has developed with a number of international standards. A number of these international standards include the use of variable length codes (VLCs). For example, an international standard published by the ITU-T as Recommendation H.263+ includes a variable length code (VLC) decoding.

The current draft of the H.264/MPEG-4 Part 10 specification includes a decoding process in which VLC codes are used. See "Draft Errata List with Revision-Marked Corrections for H.264/AVC," the approved Joint Video Team (JVT) output document from the Sep. 2-5, 2003 meeting, JVT-1050.doc. In common with earlier video coding standards, H.264 does not specify how to compress ("encode") video and, instead, specifies the syntax of a bitstream containing coded video data and a method of decoding the data.

During entropy coding with an H.264 video encoder, quantized transform coefficients and side information (including motion vectors, prediction mode choices and headers) are entropy coded using variable-length codes or arithmetic coding. If variable-length coding is used, quantized transform coefficients are coded using a context-adaptive variable length coding (CAVLC) and other syntax elements are coded with "universal" variable length codes.

CAVLC exploits the coefficients' statistical correlation by first scanning them in a zigzag manner into a one-dimensional array. Every non-zero coefficient is then associated with a variable run that counts the number of zero coefficients to the previous non-zero coefficient.

Often 1 bits with a sign are among the highest-frequency coefficients. These are counted and coded with the total number of non-zero coefficients using one rule from a set of code tables. The decision of which table to use is made based on the number of non-zero coefficients in neighboring blocks. Additionally, the sign of the 1 bit has to be indicated to the decoder. The values of the remaining coefficients are then coded using adaptive Rice codes. Thus, several code tables are used, and the choice among the tables is made according to the value of the previously encoded coefficient. Thereafter, the sum of the runs is computed and encoded with one out of 15 tables depending upon the number of non-zero coefficients in that block. At this point, the only remaining operation is to code the individual run values with one out of seven code tables, depending upon the remaining sum of the runs. All code tables used by CAVLC are generated empirically.

To summarize, CAVLC encoding of a block of transform coefficients proceeds as follows. First, the number of non-zero coefficients (numCoef) and trailing ones (T1s) are encoded. Second, the sign of each T1 is encoded. Next, the levels of the remaining non-zero coefficients are encoded. Then, the total number of zeros occurring before the last coefficient is encoded. Lastly, each run of zeros is encoded.

BRIEF DESCRIPTION OF THE DRAWINGS

Some embodiments are described with respect to the following figures.

DETAILED DESCRIPTION

In Advanced Video Coding (AVC) H.264 Context Adaptive Variable Length Decoding (CAVLD), the video bit stream parsing is a complex process. It is a sequential process with decoding of the next syntax element (SE) dependent on the decoding of a previous syntax element. This limits the throughput of decoding, when a syntax element takes more than one clock to decode.

CAVLC bitstream decoding performance may be improved and power reduced by pushing the variable length decoding (VLD) beyond one syntax element per clock pulse.

The decode engine may be designed to reduce or even eliminate unnecessary feedback paths from motion prediction and coefficient generation blocks so the VLD can continue to decode syntax elements every cycle without any holdback.

Figure 1:
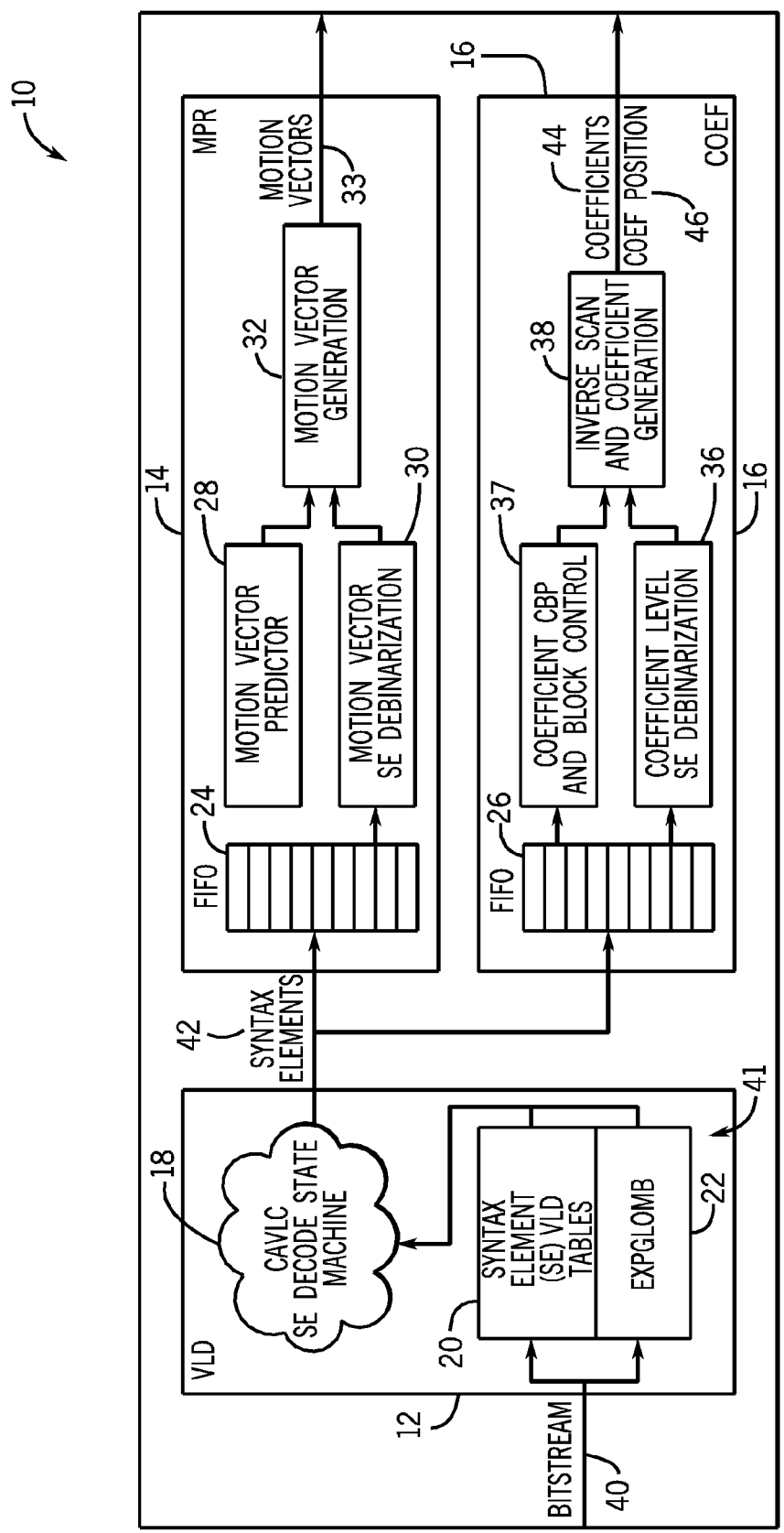
FIG. 1 is a schematic depiction of a decoder according to one embodiment.

Referring to FIG. 1, CAVLC front end decoder 10 is split into three separate blocks 12, 14, and 16. The VLD 12 reads in a bitstream 40, decodes the symbols and sends out syntax elements 42. Each VLD block 41 has all the VLD tables 20 and exponential golomb (Expglomb) 22 to convert the bitstream to all the possible symbols. CAVLC Syntax Element (SE) decode State Machine 18 understands the CAVLC decode sequence and selects the correct symbols from SE VLD tables 20 and sends them to a motion predictor (MPR) 14 and coefficients (Coef) functional unit blocks (fubs) 16 as syntax elements. MPR and Coef fubs take in syntax elements from VLD fubs and store them into an input first in first out register (FIFO) 24 or 26. The input FIFO 24 or 26 allows the VLD to continue generating syntax elements 42 while MPR and Coef fubs 16 take extra clock cycles to process them.

For the MPR fub 14, motion vector predictor fub 28 handles motion vector prediction, which is independent from bitstream decoding. The motion vector SE debinarization fub 30 uses the VLD syntax elements to generate motion vector deltas. By combining motion vector predictors and motion vector deltas, the true motion vectors 33 are formed by motion vector generation fub 32.

For the Coef fub 16, coefficient coded block pattern (CBP) and block control 37 determines whether the coefficients are coded in the macroblock and how the coefficient blocks are assembled (luma block size/frame-field coding etc.). Coefficient Level SE debinarization 36 converts syntax elements into actual signed coefficient values. By combining block control, coefficient values and inverse scan, the actual coefficients 44 and the coefficient position 46 can be determined by inverse scan and coefficient generation 38 and sent to the next stage.

Figure 2:
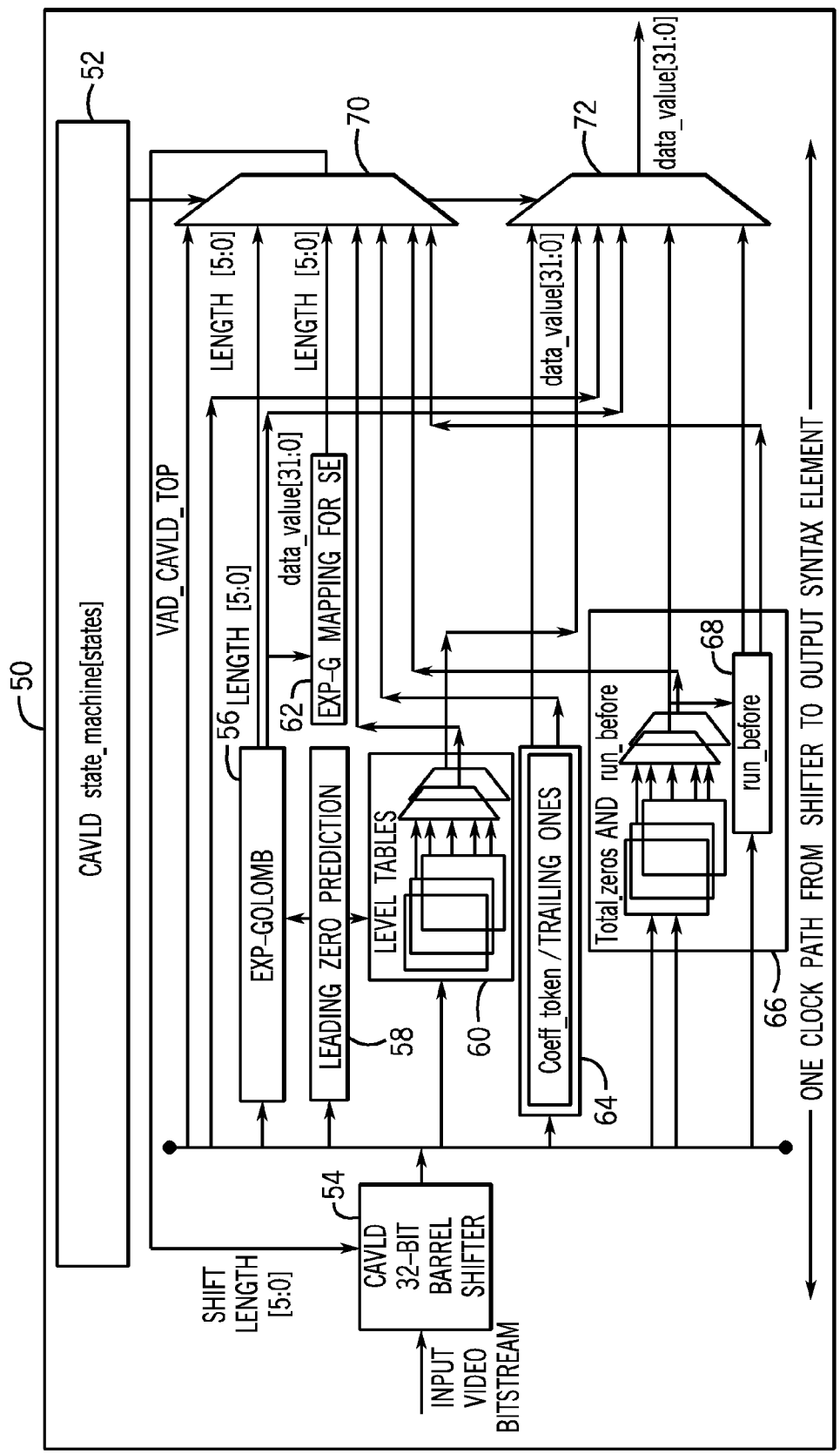
FIG. 2 is a more detailed depiction of front end decoding according to one embodiment.

FIG. 2 explains the architecture 50 of front end variable length decoding and the reduction/elimination of feedback paths with respect to decoder 12 (FIG. 1) according to one embodiment of the invention. The input bit stream data and syntax element decoding helps in achieving at least one SE per clock decoding.

The 32-bit barrel shifter 54 distributes the bits from the input video stream to the succeeding stages as needed in one embodiment. For example, the barrel shifter 54 can provide the right number of bits for each of the blocks 56, 58, 60, 64, and 66. It is able to determine the length that it should shift to those blocks from the feedback input labeled shift length [5:0].

The exponential golomb 56 may be conventional in all requests and outputs a signal length [5:0] to the multiplexer 70. The leading zero prediction 58 determines the number of leading zeros and provides an input to the exponential golomb unit 56 and the level tables 60. The level tables may be conventional in all respects in some embodiments. The value coefficient token/trailing ones 64 produces the T1 values. The total zeros and the run_before is determined in block 66.

Thus the length values go to the multiplexer 70 which feeds back to the barrel shifter 54 and the data values go to the multiplexer 72 that provides the output_data value. The CAVLD machine states are generated by the block 52. As a result of eliminating unnecessary feedback streams, one clock path exists from the shifter 54 to the output syntax element from the multiplexer 72.

By combining multiple decode symbol decodes, as explained hereafter, the VLD can decode beyond one syntax element per clock pulse. The run_before syntax elements and ZerosLeft table may be rearranged so two run_before syntax elements are decoded in one clock.

The following is a conventional run_before table for coefficients decode. This table is used to find the location of the embedded zeros. It is used to find a code for the location of zeros between the last nonzero coefficient and a first coefficient.

|            | ZerosLeft |    |     |     |     |     |     |
| run_before | 1 | 2 | 3 | 4 | 5 | 6 | >6 |
| --- | --- | --- | --- | --- | --- | --- | --- |
| 0  | 1 | 1  | 11 | 11  | 11  | 11  | 111 |
| 1  | 0 | 01 | 10 | 10  | 10  | 000 | 110 |
| 2  | — | 00 | 01 | 01  | 011 | 001 | 101 |
| 3  | — | —  | 00 | 001 | 010 | 011 | 100 |
| 4  | — | —  | —  | 000 | 001 | 010 | 011 |
| 5  | — | —  | —  | —   | 000 | 101 | 010 |
| 6  | — | —  | —  | —   | —   | 100 | 001 |
| 7  | — | —  | —  | —   | —   | —   | 0001 |
| 8  | — | —  | —  | —   | —   | —   | 00001 |
| 9  | — | —  | —  | —   | —   | —   | 000001 |
| 10 | — | —  | —  | —   | —   | —   | 0000001 |
| 11 | — | —  | —  | —   | —   | —   | 00000001 |
| 12 | — | —  | —  | —   | —   | —   | 000000001 |
| 13 | — | —  | —  | —   | —   | —   | 0000000001 |
| 14 | — | —  | —  | —   | —   | —   | 00000000001 |

The top row (ZeroLeft) indicates the number of zeros left in the current coefficients block and the left column (run_before) indicates the number of zeros between the current coefficient and next coefficient. (For example, if there are 6 zeros left and there are 2 zeros between the current and next coefficients, then there will be only 4 zeros left after the next coefficient).

Rearranging the table, VLD engine can decode two "run_before" symbols at a time when there are fewer than six ZerosLeft:

|            |   | ZerosLeft |     |     |     |     |
| run_before |   | 1 | 2 | 3 | 4 | 5 | 6 |
| --- | --- | --- | --- | --- | --- | --- | --- |
| 0 | 0 | 1 1   | 1 1  | 11 11 | 11 11 | 11 11  | 11 11   |
| 0 | 1 | 1 0   | 1 01 | 11 10 | 11 10 | 11 10  | 11 000  |
| 0 | 2 | —     | 1 00 | 11 01 | 11 01 | 11 011 | 11 001  |
| 0 | 3 | —     | —    | 11 00 | 11 001| 11 010 | 11 011  |
| 0 | 4 | —     | —    | —     | 11 000| 11 001 | 11 010  |
| 0 | 5 | —     | —    | —     | —     | 11 000 | 11 101  |
| 0 | 6 | —     | —    | —     | —     | —      | 11 100  |
| 1 | 0 | 0 01 1| 10 1 | 10 11 | 10 11 | 000 11 |         |
| 1 | 1 | —     | 01 0 | 10 01 | 10 10 | 10 10  | 000 10  |
| 1 | 2 | —     | —    | 10 00 | 10 01 | 10 01  | 000 011 |
| 1 | 3 | —     | —    | —     | 10 00 | 10 001 | 000 010 |
| 1 | 4 | —     | —    | —     | —     | 10 000 | 000 001 |
| 1 | 5 | —     | —    | —     | —     | —      | 000 000 |
| 2 | 0 | —     | 00   | 01 1  | 01 1  | 011 11 | 001 11  |
| 2 | 1 | —     | —    | 01 0  | 01 01 | 011 10 | 001 10  |
| 2 | 2 | —     | —    | —     | 01 00 | 011 01 | 001 01  |
| 2 | 3 | —     | —    | —     | —     | 011 00 | 001 001 |
| 2 | 4 | —     | —    | —     | —     | —      | 001 000 |
| 3 | 0 | —     | —    | 00    | 001 1 | 010 1  | 011 11  |
| 3 | 1 | —     | —    | —     | 001 0 | 010 01 | 011 10  |
| 3 | 2 | —     | —    | —     | —     | 010 00 | 011 01  |
| 3 | 3 | —     | —    | —     | —     | —      | 011 00  |
| 4 | 0 | —     | —    | —     | 000   | 001 1  | 010 1   |
| 4 | 1 | —     | —    | —     | —     | 001 0  | 010 01  |
| 4 | 2 | —     | —    | —     | —     | —      | 010 00  |
| 5 | 0 | —     | —    | —     | —     | 00     | 101 1   |
| 5 | 1 | —     | —    | —     | —     | —      | 101 0   |
| 6 | 0 | —     | —    | —     | —     | —      | 100     |

Since the next ZerosLeft is equal to current ZerosLeft minus run_before, it is possible to combine the decoding of two ZerosLeft into one clock.

Figure 5:
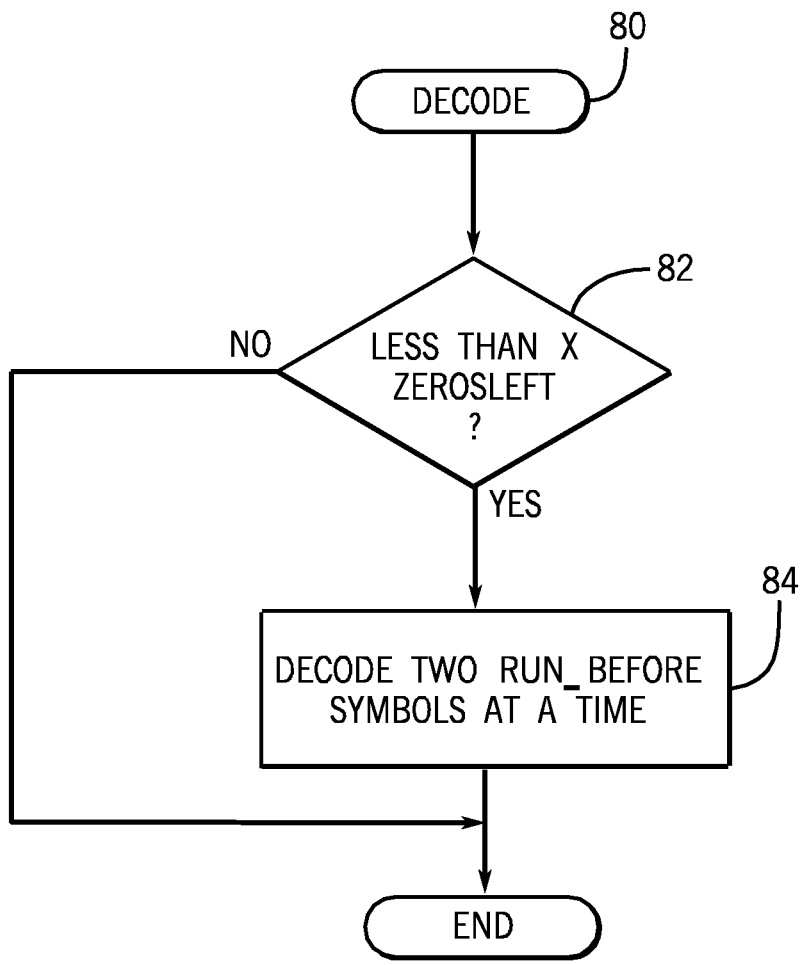
FIG. 5 is a flow chart for one embodiment.

A sequence 80, shown in FIG. 5, according to one embodiment, may be implemented in software, firmware, and/or hardware. In software and firmware embodiments, it may be implemented using computer executed instructions stored in one or more non-transitory computer readable storage media, such as magnetic, optical, or semiconductor storage, which, in some embodiments, may be part of decoder 10, which may be a processor-based device.

The sequence begins by determining whether there are less than X zeros left (diamond 82). In one embodiment, X is six, but other values may also be used. If so, two run-before symbols are decoded at a time (block 84).

Figure 3:
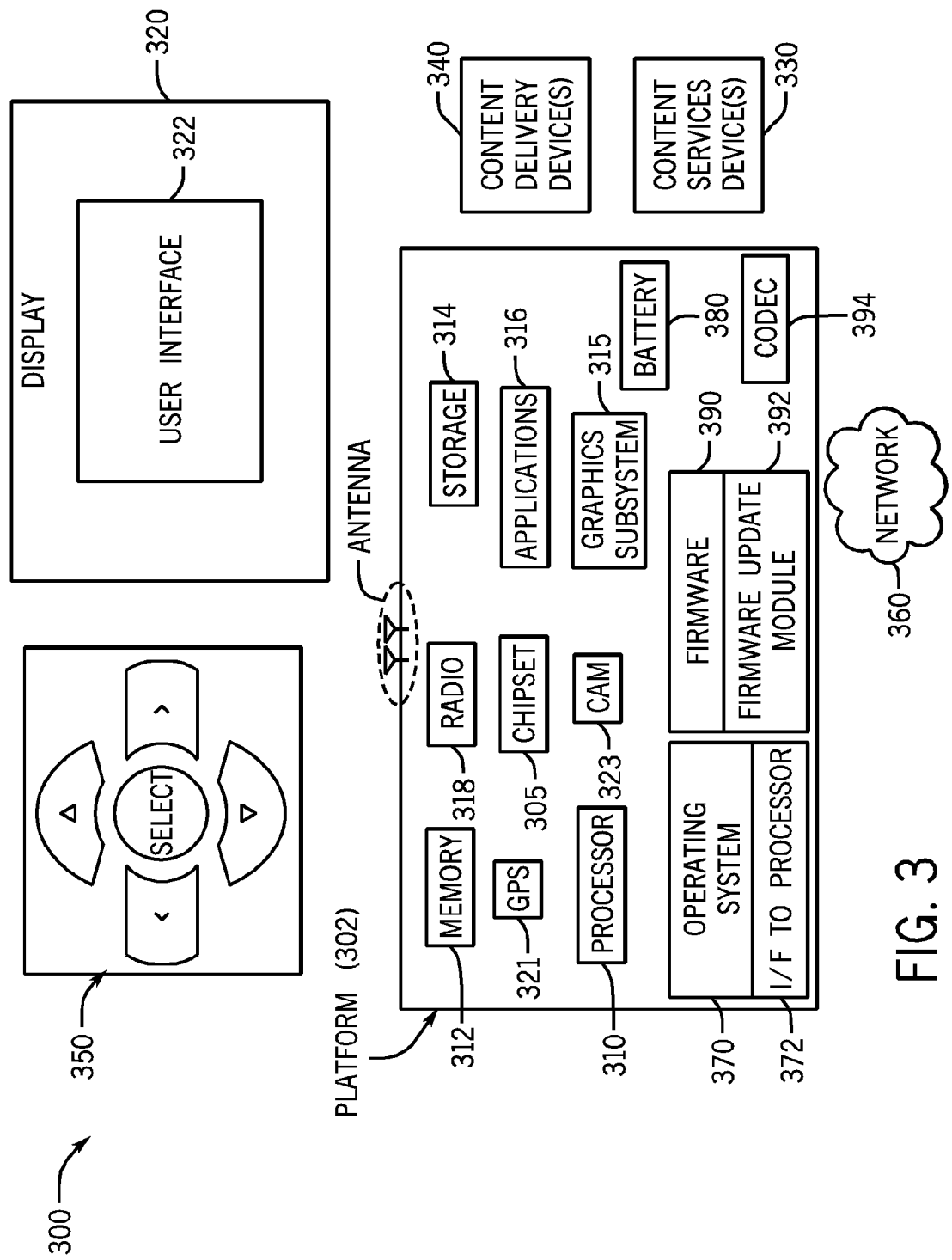
FIG. 3 is a system depiction for one embodiment.

FIG. 3 illustrates an embodiment of a system 300. In embodiments, system 300 may be a media system although system 300 is not limited to this context. The decoder 10 (FIG. 1) may be part of a codec 394, coupled to a processor 310. For example, system 300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 300 comprises a platform 302 coupled to a display 320. Platform 302 may receive content from a content device such as content services device(s) 330 or content delivery device(s) 340 or other similar content sources. A navigation controller 350 comprising one or more navigation features may be used to interact with, for example, platform 302 and/or display 320. Each of these components is described in more detail below.

In embodiments, platform 302 may comprise any combination of a chipset 305, processor 310, memory 312, storage 314, graphics subsystem 315, applications 316 and/ or radio 318. Chipset 305 may provide intercommunication among processor 310, memory 312, storage 314, graphics subsystem 315, applications 316 and/or radio 318. For example, chipset 305 may include a storage adapter (not depicted) capable of providing intercommunication with storage 314.

Processor 310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 310 may comprise dual-core processor(s), dual-core mobile processor(s), and so forth.

Memory 312 may be implemented as a volatile memory device such as, but not limited to, a Random Access Memory (RAM), Dynamic Random Access Memory (DRAM), or Static RAM (SRAM).

Storage 314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 314 may comprise technology to increase the storage performance enhanced protection for valuable digital media when multiple hard drives are included, for example.

Graphics subsystem 315 may perform processing of images such as still or video for display. Graphics subsystem 315 may be a graphics processing unit (GPU) or a visual processing unit (VPU), for example. An analog or digital interface may be used to communicatively couple graphics subsystem 315 and display 320. For example, the interface may be any of a High-Definition Multimedia Interface, DisplayPort, wireless HDMI, and/or wireless HD compliant techniques. Graphics subsystem 315 could be integrated into processor 310 or chipset 305. Graphics subsystem 315 could be a stand-alone card communicatively coupled to chipset 305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 318 may operate in accordance with one or more applicable standards in any version.

In embodiments, display 320 may comprise any television type monitor or display. Display 320 may comprise, for example, a computer display screen, touch screen display, video monitor, television-like device, and/or a television. Display 320 may be digital and/or analog. In embodiments, display 320 may be a holographic display. Also, display 320 may be a transparent surface that may receive a visual projection. Such projections may convey various forms of information, images, and/or objects. For example, such projections may be a visual overlay for a mobile augmented reality (MAR) application. Under the control of one or more software applications 316, platform 302 may display user interface 322 on display 320.

In embodiments, content services device(s) 330 may be hosted by any national, international and/or independent service and thus accessible to platform 302 via the Internet, for example. Content services device(s) 330 may be coupled to platform 302 and/or to display 320. Platform 302 and/or content services device(s) 330 may be coupled to a network 360 to communicate (e.g., send and/or receive) media information to and from network 360. Content delivery device(s) 340 also may be coupled to platform 302 and/or to display 320.

In embodiments, content services device(s) 330 may comprise a cable television box, personal computer, network, telephone, Internet enabled devices or appliance capable of delivering digital information and/or content, and any other similar device capable of unidirectionally or bidirectionally communicating content between content providers and platform 302 and/display 320, via network 360 or directly. It will be appreciated that the content may be communicated unidirectionally and/or bidirectionally to and from any one of the components in system 300 and a content provider via network 360. Examples of content may include any media information including, for example, video, music, medical and gaming information, and so forth.

Content services device(s) 330 receives content such as cable television programming including media information, digital information, and/or other content. Examples of content providers may include any cable or satellite television or radio or Internet content providers. The provided examples are not meant to limit embodiments of the invention.

In embodiments, platform 302 may receive control signals from navigation controller 350 having one or more navigation features. The navigation features of controller 350 may be used to interact with user interface 322, for example. In embodiments, navigation controller 350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 350 may be echoed on a display (e.g., display 320) by movements of a pointer, cursor, focus ring, or other visual indicators displayed on the display. For example, under the control of software applications 316, the navigation features located on navigation controller 350 may be mapped to virtual navigation features displayed on user interface 322, for example. In embodiments, controller 350 may not be a separate component but integrated into platform 302 and/or display 320. Embodiments, however, are not limited to the elements or in the context shown or described herein.

In embodiments, drivers (not shown) may comprise technology to enable users to instantly turn on and off platform 302 like a television with the touch of a button after initial boot-up, when enabled, for example. Program logic may allow platform 302 to stream content to media adaptors or other content services device(s) 330 or content delivery device(s) 340 when the platform is turned "off." In addition, chip set 305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 300 may be integrated. For example, platform 302 and content services device(s) 330 may be integrated, or platform 302 and content delivery device(s) 340 may be integrated, or platform 302, content services device(s) 330, and content delivery device(s) 340 may be integrated, for example. In various embodiments, platform 302 and display 320 may be an integrated unit. Display 320 and content service device(s) 330 may be integrated, or display 320 and content delivery device(s) 340 may be integrated, for example. These examples are not meant to limit the invention.

In various embodiments, system 300 may be implemented as a wireless system, a wired system, or a combination of both. When implemented as a wireless system, system 300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

Figure 4:
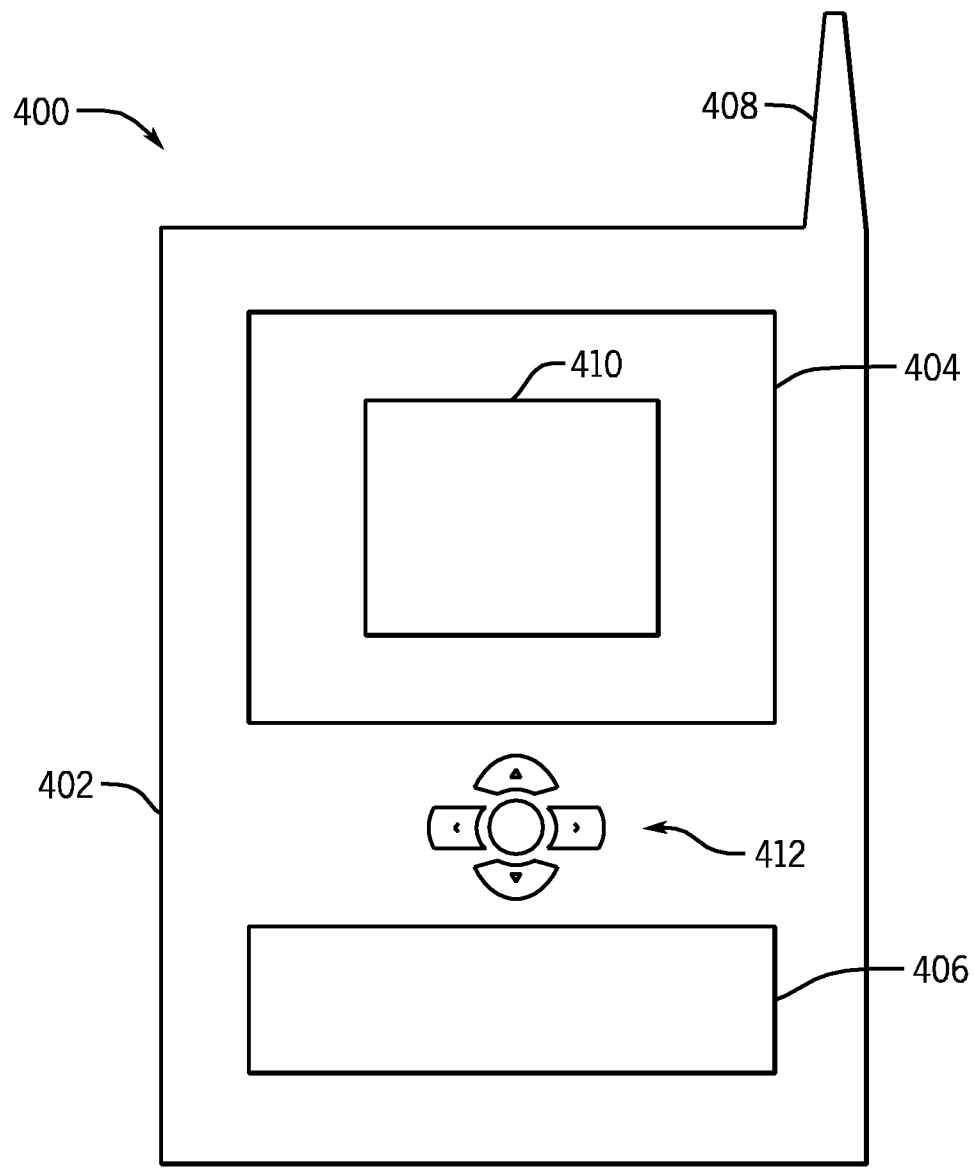
FIG. 4 is a front elevational view for one embodiment.

As described above, system 300 may be embodied in varying physical styles or form factors. FIG. 4 illustrates embodiments of a small form factor device 400 in which system 300 may be embodied. In embodiments, for example, device 400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 310 may communicate with a camera 322 and a global positioning system sensor 320, in some embodiments. A memory 312, coupled to the processor 310, may store computer readable instructions for implementing the sequences shown in FIGS. 1 and 2 in software and/or firmware embodiments. Particularly the sequences may be implemented by one or more non-transitory storage devices storing computer implemented instructions.

As shown in FIG. 4, device 400 may comprise a housing 402, a display 404, an input/output (I/O) device 406, and an antenna 408. Device 400 also may comprise navigation features 412. Display 404 may comprise any suitable display unit for displaying information appropriate for a mobile computing device. I/O device 406 may comprise any suitable I/O device for entering information into a mobile computing device. Examples for I/O device 406 may include an alphanumeric keyboard, a numeric keypad, a touch pad, input keys, buttons, switches, rocker switches, microphones, speakers, voice recognition device and software, and so forth. Information also may be entered into device 400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: performing context adaptive variable length decoding to determine if there are less than a predetermined number of ZerosLeft;

and if so, decoding two symbols at a time.

2. The method of claim 1 including decoding a syntax element in each of a plurality of cycles without holdback.

3. The method of claim 1 including using first in first out buffers to buffer syntax elements to be context-adaptive variable length decoded.

4. The method of claim 1 including if so decoding two run_before symbols at a time.

5. A non-transitory computer readable storing instructions to perform a sequence comprising: performing context adaptive variable length decoding to determine if there are less than a predetermined number of ZerosLeft;

and if so, decoding two symbols at a time.

6. The media of claim 5, the sequence including decoding a syntax element in each of a plurality of cycles without holdback.

7. The media of claim 5, the sequence including using first in first out buffers to buffer syntax elements to be context-adaptive variable length decoded.

8. The media of claim 5, the sequence including if so decoding two run_before symbols at a time.

9. An apparatus comprising: a context adaptive variable length decoder to determine if there are less than a predetermined number of ZerosLeft and if so, to decode two symbols at a time;

a motion predictor, coupled to said decoder;

and a coefficients functional block coupled to said decoder;

and a storage coupled to said decoder.

10. The apparatus of claim 9, said decoder to decode a syntax element in each of a plurality of cycles without holdback.

11. The apparatus of claim 9, said decoder to use first in first out buffers to buffer syntax elements to be context-adaptive variable length decoded.

12. The apparatus of claim 9, said decoder to determine if there are fewer than a predetermined number of ZerosLeft.

13. The apparatus of claim 12, said decoder, if so, to decode two run_before symbols at a time.

14. A system comprising: a processor;

and a codec coupled to said processor, said codec including a context adaptive variable length decoder to determine if there are less than a predetermined number of ZerosLeft and, if so, to decode two symbols at a time.

15. The system of claim 14, said decoder to decode a syntax element in each of a plurality of cycles without holdback.

16. The system of claim 14, including first in first out buffers to buffer syntax elements to be context-adaptive variable length decoded.

17. The system of claim 14, if so, said decoder to decode two run_before symbols at a time.

18. The system of claim 14 including an operating system.

19. The system of claim 14 including a battery.

20. The system of claim 14 including firmware and a module to update said firmware.

* * * * *